United States Patent [19]

Fölsch et al.

[11] Patent Number: 5,185,404
[45] Date of Patent: Feb. 9, 1993

[54] FLOW IMPROVEMENT IN THE PROCESSING OF PVC BLENDS TO BE MODIFIED FOR IMPACT STRENGTH

[75] Inventors: Karl J. Fölsch, Mainz; Klaus Frank, Mühltal; Karl-August Jung, Ober-Ramstadt, all of Fed. Rep. of Germany

[73] Assignee: Rohm GmbH Chemische Fabrik, Darmstadt, Fed. Rep. of Germany

[21] Appl. No.: 738,445

[22] Filed: Jul. 31, 1991

[30] Foreign Application Priority Data

Aug. 3, 1990 [DE] Fed. Rep. of Germany ....... 4024690

[51] Int. Cl.⁵ ................... C08L 33/10; C08L 33/12; C08L 27/06; C08L 25/02
[52] U.S. Cl. ................... 525/222; 525/221; 525/80; 525/239; 264/328.1
[58] Field of Search ............... 525/80, 221, 239, 222, 525/221, 80; 264/328.1

[56] References Cited

U.S. PATENT DOCUMENTS 3,983,186  9/1976  Eilers et al. .................. 525/80
4,413,092  11/1983 Witschard .................... 525/80
4,440,905  4/1984  Dunkelberger ............... 525/80

FOREIGN PATENT DOCUMENTS 0058979  9/1982  European Pat. Off. .
0138121  4/1985  European Pat. Off. .
3542469  6/1987  Fed. Rep. of Germany .
2167677  8/1973  France .
61-21152  7/1984  Japan .................... 525/80

Primary Examiner—James J. Seidleck
Assistant Examiner—W. R. H. Clark
Attorney, Agent, or Firm—Oblon, Spivak, McClelland, Maier & Neustadt

[57] ABSTRACT

This invention relates to the flow improvement of compositions containing PVC to be modified for impact resistance, such as PVC-ABS polymer blends, during their processing, for example during injection molding, in processing machines by polymers based on alkyl methacrylate that are made up of at least 50 wt. % methyl methacrylate and with 2 to 50 wt. % $C_{2-8}$-alkyl methacrylates as monomers, with molecular weights $\overline{M}w$ in the range of 2,000 to $\leq$20,000 g/mol.

14 Claims, No Drawings

FLOW IMPROVEMENT IN THE PROCESSING OF PVC BLENDS TO BE MODIFIED FOR IMPACT STRENGTH

BACKGROUND OF THE INVENTION

1. Field of the Invention

The present invention relates to flow improvement in the processing of compositions containing PVC in processing machinery with polymers based on alkyl methacrylate.

2. Discussion of the Background

While soft polyvinylchloride (PVC) was a readily processable plastic at an early time from its content of plasticizers, substantial obstacles stood in the wa of thermoplastic processing of pure, high molecular weight PVC, particularly because of its thermal instability and its rheologic properties. These could be overcome by adding various aids, so that a PVC suitable for processing always consists of a mixture of various components. The main purpose of lubricants, which are used as processing aids along with other additives, is to improve the flow of high-viscosity PVC melts when working and plasticizing them in the different processing machines. Lubricants decrease the friction of the PVC particles and thereby prevent the production of considerable heats of friction, as well as the possible higher polymer temperature from friction between the surface of the processing machinery and the melt. PVC degradation reactions that may be caused by mechanical damage from shear forces and overheating are thereby avoided or distinctly reduced.

For processing hard PVC into semifinished product and finished parts, high-polymer processing aids are used based on polymethyl methacrylate (PMMA), which in addition to shortening the plasticizing process, bring about an improvement of the rheologic properties in the thermoplastic state. In contrast to other additives that affect the rheology, such as the plasticizers and lubricants already mentioned with molecular weights in g/mol of several hundred to about $10^3$, the molecular weights $\overline{M}w$ of the high-polymer processing aids based on PMMA are between $1.2 \times 10^5$ and $2.5 \times 10^6$ g/mol (Kunststoff Handbuch) 2/1, Polyvinyl chloride, 2nd edition, 1986, Carl Hanser, Verlag Munich, Vienna, pages 595 to 597).

Molding compositions based on vinyl chloride polymers are disclosed by DE-A 35 42 469 in which the overall properties, especially the processing properties, can be distinctly improved by adding thermoplastic polymers of styrene, α-methylstyrene, p-methylstyrene, vinyltoluene, (meth)acrylonitrile, methyl methacrylate, or mixtures of them, and which have an intrinsic viscosity of 2 to 15 ml/g (measured in dimethylformamide at 25° C.), and a sulfur content of 1.15 to 3.95 wt.%.

PVC can also be blended with other thermoplastics and elastomers to produce modified PVC, with blends being obtained that have technically valuable properties, such as PVC plastics with increased impact strength or better heat resistance.

Examples of structural materials, for example for manufacturing cases, are PVC/ABS blends in which the impact strength of the PVC is substantially improved by admixing the acrylonitrile-butadiene-styrene rubber (ABS). PVC and ABS are two incompatible polymers, i.e., blends of these two polymers are two-phased. Because of the incompatibility of the two types of polymer, large, macroscopic regions of inhomogeneity occur during mechanical processing of PVC-ABS blends, for example during the injection molding of large parts, which cause a high rejection rate of the processed polymer blend. The inhomogeneities are visible as streaks, splinters, scales, and separations into differently colored areas in the processed parts. These inhomogeneities of injection molded articles are attributable to inhomogeneities in the flow of the molten blend in the processing machine.

Therefore, there is the problem of preparing mixtures of PVC and other thermoplastically processable polymers such as PVC/ABS mixtures, which are processed mechanically to incompatible blends such as PVC/ABS blends so that finished parts with no macroscopic regions of inhomogeneity can be obtained reliably.

It has been found that the mechanical processing of incompatible polymer mixtures containing PVC into corresponding plastic blend articles with no macroscopic regions of inhomogeneity can be accomplished reliably with polymers based on alkyl methacrylate, which are copolymers of methyl methacrylate in particular, and have molecular weights $\overline{M}w$ in the range of 2,000 to $\leq 20,000$.

SUMMARY OF THE INVENTION

Accordingly, one object of the present invention is to provide a novel process for the mechanical processing of incompatible polymer mixtures containing PVC into plastic blend articles. The object of the present invention is provided for by a process on which $C_{1-8}$-alkyl methacrylate copolymers with molecular weights $\overline{M}w$ in the range of 2,000 to $\leq 20,000$ g/mol are added to the polymer mixtures for mechanical processing.

The molecular weight $\overline{M}w$ of the rheology-improving agents based on alkyl methacrylate polymer is advantageously in the range of 2,000 to 15,000, especially in the range of 2,000 to 10,000. The rheology-improving agents, also called flow promoters, are methyl methacrylate copolymers that are made up of 50–98 wt.% methyl methacrylate, 2 to 50 wt.% alkyl methacrylates with 2 to 8 carbon atoms in the alkyl group, and 0 to 48% other comonomers.

The processing of the polymer mixtures pursuant to the invention is carried out especially on injection molding machines and is particularly important for the processing of PVC/ABS mixtures with 30 to 7 wt.% proportions of ABS based on the total PVC-ABS fraction, into PVC blends modified for impact strength, which are used, for example, as chassis components, for example for computer cases.

The outcome of the invention is surprising. High-polymer processing aids based on polymethyl methacrylate and with molecular weights from $1.2 \times 10^5$ to $2.5 \times 10^6$, like Irgamods ® from Ciba Geigy, improve the rheologic properties and produce improvements of the mechanical properties in the finished parts in the thermoplastic state in the thermoplastic processing of hard PVC into semifinished products and finished parts. However, these same additives have negative effects in the thermoplastic processing of PVC mixtures containing impact strength modifiers, such as PVC-ABS mixtures, because of uncontrollable action with high rejection rates. Some types of PMMA with $\overline{M}w > 50,000$ g/mol, and such polymers with functional groups, or commercial polymer plasticizers based on PVA-PE (70/30) and with a molecular weight of 375,000 g/mol, with which the injection molded parts showed a tendency toward stickiness and formation of coatings because of the high proportions of plasticizer, were unable to improve the rheologic properties of the polymer blends during their thermoplastic processing, for example during injection molding, and the molded parts showed other drawbacks. Only the addition of very low molecular weight $C_{1-8}$-alkyl methacrylate copolymers lead to the surprising solution of the problem. The state of the art did not suggest the invention as stated above, and by which injection molded parts with homogeneous appearance are obtained, whose heat resistance and especially whose level of impact strength are not lowered by the addition pursuant to the invention.

DETAILED DESCRIPTION OF THE PREFERRED EMBODIMENTS

The process pursuant to the present invention for the mechanical production of incompatible PVC blends, especially those modified for impact strength, is carried out with grades of PVC from various production processes such as suspension, emulsion, or bulk PVC. The PVC used is preferably in powdered form or granular form with particle sizes of 1 to 2 mm for thorough mixing of the PVC with the polymers to be blended and the processing aids. The use of spray-dried products originating from emulsion polymerization is advantageous.

Of special importance for the production of industrially useful impact strength-modified PVC polymer blends are ABS polymers, which can be produced by various processes (see Ullmann's Encylklopädia der technischen Chemie, 4th Edition, Volume 19, pp. 277 to 287), and which, like the PVC component, are used in finely divided form for production of the mixtures to be processed mechanically.

The PVC and ABS polymers are used in a ratio of 70 : 30 to 30 : 70 by weight, preferably in a ratio of 60 : 40 to 40 : 60 by weight, and especially in a ratio of about 50 : 50 by weight for the production of the impact strength-modified molded parts according to the invention.

The low molecular weight $C_{1-8}$-alkyl methacrylate copolymer additive pursuant to the invention performs the function of a flow promoter, based on various tests and the results obtained in processing the finely divided mixtures. To produce the relatively low molecular weight polyalkyl methacrylate with a molecular weight in the range of 2,000 to 20,000 g/mol, alkyl methacrylates with 1 to 8 carbon atoms in the alkyl group are polymerized by known methods (Rauch-Puntigam, Vlker, Acrylic and Methacrylic Compounds, Springer-Verlag Berlin, Heidelberg, N.Y., 1967), with at least 50 wt.% methyl methacrylate being used as the main monomer. Optionally the polymerization is conducted in the presence of other monomers, especially alkyl acrylates with 1 to 8 carbon atoms in the alkyl group. The polymerization can be carried out in bulk, suspension, or emulsion. The additives pursuant to the invention are advantageously made by emulsion polymerization and obtained from the emulsion by spray drying. They are obtained in this way with a particle size suitable for blending. Polymers made by bulk or suspension polymerization have to be crushed mechanically into the optimally suitable additive form.

The degree of polymerization and thus the molecular weight of the processing aid pursuant to this invention can be adjusted by known methods (see Rauch-Puntigam, Volker, loc. cit.), for example by the ratio of initiators to monomers or by adding regulators as chain transfer agents. Examples of known chain transfer agents used are aliphatic/chlorinated hydrocarbons or advantageously aliphatic mercaptans. Examples of useful mercaptans are n-butyl mercaptan, n-dodecyl mercaptan, t-dodecyl mercaptan, and 2-ethylhexyl thioglycolate. With molecular weights $\overline{M}w$ of 2,000 to 20,000 g/mol, determined by gel permeation chromatography, the processing aids pursuant to the invention have solution viscosities ($\eta_{sp/c}$) in the range of 3 to 20 ml/g, particularly in the range of 5 to 10 ml/g, measured according to DIN 51562 in chloroform as solvent. High polymer PVC additives based on polymethacrylate pursuant to the state of the art, on the other hand, have solution viscosities ($\eta_{sp/c}$) in chloroform of 50 to 500 ml/g, which corresponds to molecular weights $\overline{M}w$ of $1.2 \times 10^5$ to $2.5 \times 10^6$ g/mol. As stated, they do not produce the effect pursuant to the invention.

The alkyl methacrylate copolymer additives pursuant to the invention are made up of 50 to 100 wt.% alkyl methacrylates with 1 to 8 carbon atoms in the alkyl group as monomers, with at least 50 wt.% to 98 wt.% methyl methacrylate being incorporated in the polymer. In addition to the 2 to 50 wt.% alkyl methacrylates with 2 to 8 carbon atoms in the alkyl group, 0 to 48 wt.% alkyl acrylates with 1 to 8 carbon atoms in the alkyl group, such as methyl acrylate, ethyl acrylate, n-butyl acrylate, can also be incorporated in the flow promoter pursuant to the invention. Besides methyl methacrylate, examples of $C_{2-8}$-alkyl methacrylates used as comonomers in the preparation of the alkyl methacrylate copolymers that are made up of at least 50 wt.% methyl methacrylate as monomer, are ethyl methacrylate, n-propyl methacrylate, n-butyl methacrylate, i-butyl methacrylate, n-hexyl methacrylate, and 2-ethylhexyl methacrylate.

These polymers can also include other monomers such as styrene or aorylonitrile or the like, in amounts of 0 to 48 wt.%, especially 0 to 20 wt.%.

Copolymers in the molecular weight range pursuant to the invention that are made up of 60 to 95 wt.% methyl methacrylate and 40 to 5 wt.% n-butyl methacrylate as monomers have proved to be advantageous flow promoters with effects pursuant to the invention. Examples of the polymers acting as flow promoters according to the invention are accordingly those of monomer mixtures of 80 wt.% methyl methacrylate and 20 wt.% n-butyl methacrylate, or 90 wt.% methyl methacrylate and 10 wt.% n-butyl methacrylate with molecular weight $\overline{M}w$ of 5,000 to 7,000 g/mol, determined by the method of gel permeation chromatography (Chemie Labor Betrieb 3(980) 232–236).

The polymeric processing aid of this invention is added to the polymer mixture to be processed mechanically, for example by injection molding, in an amount of 0.1 to 10 parts by weight, preferably in an amount of 0.5 to 8 parts by weight, and especially in an amount of 1 to 5 parts by weight per 100 parts by weight of polymer mixture.

Other additives such as stabilizers, antioxidants, pigments, lubricants, or dyes can optionally be added to the vinyl chloride polymer compositions to be processed pursuant to this invention. Additives of this type are clear from the specified compositions of the Examples.

Having generally described this invention, a further understanding ca be obtained by reference to certain specific examples which are provided herein for purposes of illustration only and are not intended to be limiting unless otherwise specified.

Methods for evaluating the process pursuant to the present invention (Kunststoof Handbuck) 2/1, loc. cit., pages 590 to 594).

Measurements were made in a high-pressure capillary viscosimeter to evaluate the flow property of plasticized molding compositions according to the invention. The melt viscosity $\eta_s$ of the mixture with the dimension [Pa·s], its flow time FZ in seconds and the strand expansion B in %, are determined at a constant temperature and at a given pressure, for example at 180° C. and 5 kp, specified in the Examples as 180/5. The melt index, MFI, with the dimension g/10 min, was also measured on this instrument.

For evaluation under practical conditions of use, a flow spiral was injection molded from the composition to be tested with constant machine parameters, the spiral length X was determined in cm, and the flow path lengthening was calculated in % compared to the composition without the rheology improver pursuant to the invention.

The addition of 3 parts of polymethacrylate pursuant to the invention, for example, to 100 parts of PVC-ABS blend produces an increase of the spiral length of up to about 20% compared to the process not modified pursuant to the invention.

The test results are given in the table in the Experimental Part.

EXPERIMENTAL PART

Examples

A. Preparation of the additives pursuant to the invention

1. Methyl methacrylate/n-butyl methacrylate 80/20 copolymer, 0.9 g of $C_{15}$-paraffin sulfonate Na salt, and 11.1 g of sodium persulfate are dissolved in 1,200 g of deionized water at 20° C. in a 7-liter reaction vessel equipped with reflux condenser, stirrer, and in-feed container. Into this solution at 80° C. is fed with stirring an emulsion of the following components:

2,400 g Methyl methacrylate
600 g Butyl methacrylate
210 g 2-Ethylhexyl thioglycolate
27 g $C_{15}$-Paraffin sulfonate Na salt
2,053 g Deionized water The time of addition is 4 hours. After the addition is completed, the batch is cooled to room temperature. 2.3 g of 1,4-diisopropylbenzene monohydroperoxide and 1.8 g of sodium hydroxymethylsulfinate are then added at 70° C. The dispersion is then filtered. The pH of the 50% dispersion is 2.0, and the particle diameter is about 190 nm. The sulfur content of the dried polymer is 1.0%.

2. Methyl methacrylate/n-butyl methacrylate 90/10 copolymer

The procedure is the same as in A1, but 2,700 g of methyl methacrylate and 300 g of butyl methacrylate are fed in. The pH of the 50% dispersion is 2.0, and the particle diameter is about 240 nm. The sulfur content of the dried polymer is 1.02%.

Obtaining the solids

The solids are obtained from the dispersion by spray drying. The intrinsic viscosities $\eta_{spec/c}$, measured in chloroform as solvent, are as follows:

| | $\eta$ spec/c (ml/g) | $\overline{M}w$ (g/mol) |
|---|---|---|
| Polymer A1 | 8 | 5,870 |
| Polymer A2 | 8.5 | 5,930 |

B. Processing PVC-ABS blends by injection molding

As preparation for mechanical processing, the polymer components PVC and ABS as commercial products are mixed with commercial PVC additives such as pigments, lubricants, and stabilizers, as well as with the low molecular weight polymethacrylates pursuant to the present invention. The mixture thus obtained (dry blend) can be further processed as such directly in the injection molding machine, or it can be granulated before the injection molding.

Table 1 shows formula compositions and the results that were obtained with such blends by measurements in a highpressure capillary viscosimeter (see Flow Properties) and in injection molding (flow spiral), with results of processing with blends without the additive pursuant to the invention being indicated for comparison: Comparative Experiments 1, 6, and 11.

TABLE 1

| | Comp. 1 Parts | 2 Parts | 3 Parts | 4 Parts | 5 Parts | Comp. 6 Parts | 7 Parts | 8 Parts | 9 Parts | 10 Parts | Comp. 11 Parts | 12 Parts | 13 Parts | 14 Parts | 15 Parts |
|---|---|---|---|---|---|---|---|---|---|---|---|---|---|---|---|
| Product | | | | | | | | | | | | | | | |
| PVC: SOLVIC ® 250 SA | 50 | 50 | 50 | 50 | 50 | 50 | 50 | 50 | 50 | 50 | 50 | 50 | 50 | 50 | 50 |
| ABS: Blendex ® 703 | 50 | 50 | 50 | 50 | 50 | 50 | 50 | 50 | 50 | 50 | 50 | 50 | 50 | 50 | 50 |
| Kronos ® CL 220 (Pigment) | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| Loxiol ® (Lubricant) | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Loxiol ® G70S (Lubricant) | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Irgastab ® T 22 M | — | — | — | — | — | 2.0 | 2.0 | 2.0 | 2.0 | 2.0 | — | — | — | — | — |
| Irgastab ® | 2.0 | 2.0 | 2.0 | 2.0 | 2.0 | — | — | — | — | — | — | — | — | — | — |
| Irgastab ® | — | — | — | — | — | — | — | — | — | — | 1.5 | 1.5 | 1.5 | 1.5 | 1.5 |
| Rheology Improver based on PMMA | | | | | | | | | | | | | | | |
| from A1 | — | 3.0 | 5.0 | — | — | — | 3.0 | 5.0 | — | — | — | 3.0 | 3.0 | — | — |
| from A2 | — | — | — | 3.0 | 5.0 | — | — | — | 3.0 | 5.0 | — | — | — | 3.0 | 5.0 |
| Results: | | | | | | | | | | | | | | | |
| Flow Properties: | | | | | | | | | | | | | | | |
| MFI 190/5 (g/10 min) | 2.93 | 2.94 | 2.54 | 2.89 | 3.37 | 2.70 | 3.08 | 3.94 | 3.30 | 3.76 | 2.17 | 2.95 | 3.34 | 2.79 | 3.08 |
| $\eta_s$ (Pa.s) | 4915 | 4754 | 3983 | 4240 | 4112 | 3823 | 3328 | 3161 | 3122 | 2801 | 5493 | 4337 | 4015 | 4433 | 4176 |
| FZ 180/g (s) | 145 | 140 | 118 | 125 | 121 | 113 | 98 | 93 | 92 | 83 | 162 | 128 | 118 | 131 | 123 |
| B (%) | 39 | 44 | 48 | 44 | 47 | 42 | 46 | 47 | 43 | 47 | 37 | 40 | 43 | 40 | 42 |

TABLE 1-continued

| | Comp. 1 Parts | 2 Parts | 3 Parts | 4 Parts | 5 Parts | Comp. 6 Parts | 7 Parts | 8 Parts | 9 Parts | 10 Parts | Comp. 11 Parts | 12 Parts | 13 Parts | 14 Parts | 15 Parts |
|---|---|---|---|---|---|---|---|---|---|---|---|---|---|---|---|
| Flow spiral length $\bar{x}$ (cm) with constant machine parameters | 58 | 68 | 70 | 70 | 70 | 62 | 72 | 73 | 66 | 69 | 54 | 61 | 64 | 58 | 62 |
| Flow path lengthening (%) compared to control batch | | 17 | 21 | 21 | 21 | | 16 | 18 | 6 | 11 | | 13 | 19 | 7 | 15 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the U.S. is:

1. A process for the mechanical processing of incompatible polymer blends containing PVC into plastic blend articles, comprising adding alkyl methacrylate copolymers with molecular weights $\overline{M}w$ in the range of 2,000 to $\leq$10,000 g/mol to an incompatible polymer blend and mechanically processing said polymer blend.

2. The process of claim 1, wherein the polymer blend is PVC-ABS blend that contains PVC and ABS in a ratio of 70 : 30 to 30 : 70 by weight.

3. The process of claims 1 and 2, wherein the alkyl methacrylate copolymers comprise 50 to 100 wt.% alkyl methacrylates with 1 to 8 carbon atoms in the alkyl group as monomers.

4. The process of claims 1 or 2 wherein the alkyl methacrylate copolymers comprise 50 to 98 wt.% methyl methacrylate as monomer.

5. The process of claims 1 or 2, wherein the alkyl methacrylate copolymers comprise 60 to 95 wt.% methyl methacrylate and 40 to 5 wt.% n-butyl methacrylate as monomers.

6. The process of claims 1 or 2, wherein the alkyl methacrylate copolymers comprise at least 50 wt.% methyl methacrylate, 2 to 50 wt.% alkyl methacrylates with 2 to 8 carbon atoms in the alkyl group and 0 to 48 wt.% alkyl acrylates with 1 to 8 carbon atoms in the alkyl group as monomers.

7. The process of claim 6, wherein the alkyl methacrylate copolymers additionally comprise 0–48 wt.% of other monomer.

8. The process of claim 1, wherein the alkyl methacrylate copolymers are added in an amount of 0.1 to 10 parts by weight based on 100 parts by weight of polymer blend.

9. The process of claim 8, wherein the alkyl methacrylate copolymers are added in an amount of 0.5 to 8 parts by weight based on 100 parts by weight of polymer blend.

10. The process of claim 8, wherein the alkyl methacrylate copolymers are added in an amount of 1 to 5 parts by weight based on 100 parts by weight of polymer blend.

11. The process of claim 5, wherein said alkyl methacrylate copolymers comprise 80–90% methyl methacrylate and 10–20% n-butyl-methacrylate as monomer.

12. The process of claim 5, wherein said alkyl methacrylate copolymers have molecular weights $\overline{M}w$ in the range of 5,000 to 7,000.

13. The process of claim 1, wherein said polymer blend is mechanically processed by injection molding.

14. The process of claim 6, wherein said other monomer is selected from the group consisting of styrene and acrylonitrile or a mixture thereof.

* * * * *

UNITED STATES PATENT AND TRADEMARK OFFICE
CERTIFICATE OF CORRECTION

PATENT NO. : 5,185,404

DATED : February 9, 1993

INVENTOR(S) : Karl J. Folsch et al.

It is certified that error appears in the above-identified patent and that said Letters Patent is hereby corrected as shown below:

On the title page, Item [30],

The second Foreign Application Priority Data has been omitted, please insert: --Nov. 8, 1990 [DE] Fed. Rep. of Germany....4035491--

Signed and Sealed this

Sixteenth Day of November, 1993

*Attest:*

BRUCE LEHMAN

*Attesting Officer*     *Commissioner of Patents and Trademarks*